United States Patent
Florencio et al.

(10) Patent No.: US 8,553,757 B2
(45) Date of Patent: Oct. 8, 2013

(54) FORWARD ERROR CORRECTION FOR MEDIA TRANSMISSION

(75) Inventors: Dinei A. Florencio, Redmond, WA (US); Philip A. Chou, Bellevue, WA (US); Suleyman Serdar Kozat, White Plains, NY (US)

(73) Assignee: Microsoft Corporation, Redmond, WA (US)

( * ) Notice: Subject to any disclaimer, the term of this patent is extended or adjusted under 35 U.S.C. 154(b) by 1755 days.

(21) Appl. No.: 11/675,047

(22) Filed: Feb. 14, 2007

(65) Prior Publication Data

US 2008/0192738 A1 Aug. 14, 2008

(51) Int. Cl.
*H04L 12/66* (2006.01)
*H04L 12/28* (2006.01)

(52) U.S. Cl.
USPC .......... 375/240; 375/253; 714/746; 714/751; 714/776; 370/389; 370/216; 370/232; 370/235; 370/238

(58) Field of Classification Search
USPC ........................................ 375/240
See application file for complete search history.

(56) References Cited

U.S. PATENT DOCUMENTS

| | | | | |
|---|---|---|---|---|
| 5,999,563 A * | 12/1999 | Polley et al. | ........ | 375/222 |
| 6,012,026 A * | 1/2000 | Taori et al. | ........ | 704/229 |
| 6,363,425 B1 * | 3/2002 | Hook et al. | ........ | 709/226 |
| 6,434,606 B1 * | 8/2002 | Borella et al. | ........ | 709/214 |
| 6,704,281 B1 * | 3/2004 | Hourunranta et al. | ........ | 370/230 |
| 6,785,261 B1 * | 8/2004 | Schuster et al. | ........ | 370/352 |
| 6,912,584 B2 * | 6/2005 | Wang et al. | ........ | 709/231 |
| 6,920,179 B1 * | 7/2005 | Anand et al. | ........ | 375/240.26 |
| 6,947,598 B2 * | 9/2005 | Yogeshwar et al. | ........ | 382/232 |
| 7,017,102 B1 * | 3/2006 | Kristensson et al. | ........ | 714/786 |
| 7,072,366 B2 * | 7/2006 | Parkkinen et al. | ........ | 370/538 |
| 7,702,504 B2 * | 4/2010 | Son et al. | ........ | 704/219 |
| 7,929,601 B2 * | 4/2011 | Vitali et al. | ........ | 375/240.03 |
| 2001/0022000 A1 * | 9/2001 | Horn et al. | ........ | 725/95 |
| 2002/0071485 A1 * | 6/2002 | Caglar et al. | ........ | 375/240.01 |
| 2003/0035478 A1 * | 2/2003 | Taubman | ........ | 375/240.11 |
| 2003/0126238 A1 * | 7/2003 | Kohno et al. | ........ | 709/220 |
| 2006/0088093 A1 * | 4/2006 | Lakaniemi et al. | ........ | 375/240.01 |
| 2006/0109805 A1 * | 5/2006 | Malamal Vadakital et al. | ........ | 370/299 |

OTHER PUBLICATIONS

Vutukuru, M., et al, 'Cross-Layer Wireless Bit Rate Adaptation', SIGCOMM'09, Aug. 17-21, 2009, ACM 978-1-60558-594-9/09/08, entire document, http://www.sigcomm.org/sites/default/files/ccr/papers/2009/October/1594977-1592571.pdf.*

(Continued)

*Primary Examiner* — Edan Orgad
*Assistant Examiner* — Ronald Baum
(74) *Attorney, Agent, or Firm* — Lyon & Harr, LLP; Mark A. Watson (57) ABSTRACT

A "Media Transmission Optimizer" provides a media transmission optimization framework for lossy or bursty networks such as the Internet. This optimization framework provides a novel form of dynamic Forward Error Correction (FEC) that focuses on the perceived quality of a recovered media signal rather than on the absolute accuracy of the recovered media signal. In general, the Media Transmission Optimizer provides an encoder that optimizes the transmission of redundant frames of electronic media information encoded at different bit rates, and provides optimized playback quality by providing a decoder that automatically selects an optimal path through one or more available representations of each frame as a function of overall rate/distortion criteria.

20 Claims, 5 Drawing Sheets

(56) References Cited

OTHER PUBLICATIONS

Davis, G. M., J. M. Danskin, Joint source and channel coding for image transmission over lossy packet networks, Proceedings of the SPIE—The Int'l Soc. for Optical Eng'g, pp. 376-387, vol. 2847.

Hardman, V., M. A. Sasse, M. Handley, and A. Watson, Reliable audio for use over the internet,Proc. of Internet Society's Int'l Networking Conf. (INET'95), Jun. 1995, pp. 171-178.

Liang, Y.J., N. Farber, B. Girod, Adaptive playout scheduling and loss concealment for voice communications over IP networks. IEEE Transactions on Multimedia, 2003, pp. 532-543, vol. 5, No. 4.

Perkins, C., O. Hodson, and V. Hardman, A survey of packet-loss recovery for streaming audio, IEEE Network, Sep./Oct. 1998, pp. 40-48, vol. 12, No. 5.

* cited by examiner

FORWARD ERROR CORRECTION FOR MEDIA TRANSMISSION

BACKGROUND

1. Technical Field

The invention is related to media communications via lossy or unreliable networks such as the internet, and in particular, to a technique for providing dynamic rate/distortion-based forward error correction (FEC) for optimizing real-time media transmissions (e.g., voice, video, two-way communications, etc.) across lossy networks.

2. Related Art

Reliable delivery of an audio or video media transmission, or of some combination thereof over an inherently unreliable packet-based network such as the Internet, is a challenging task. During any given network connection between two or more computing devices (e.g., client computers, server computers, phones, etc.), the available bandwidth and connection reliability between those computing devices can vary greatly. As a result, individual data packets representing encoded portions of the media transmission can be lost or delayed. Consequently, it is difficult to guarantee a smooth and consistent playback quality for real-time media transmissions such as real-time communications or live transmissions between devices.

For example, as is well known to those skilled in the art, the bandwidth available to networks such as the Internet fluctuates over time for reasons such as network traffic, number of users, etc. Consequently, the available bandwidth between any two or more computing devices, will typically fluctuate during any given connection session. Such variance in available bandwidth is not typically of great concern, however, with real-time or near real-time media transmissions, the fluctuations can result in drastic changes in the quality of the media playback over time, along with noticeable artifacts in the playback as the playback quality changes.

Another problem frequently observed with networks such as the Internet is that because such networks have very little guarantee of quality of service (QoS), data packets are often lost or delayed during transmission. Consequently, data packets comprising portions of media transmissions may arrive either late or out of sequence, or may not arrive at all. Further, where data packets representing a media transmission are lost or delayed beyond a predetermined minimum time constraint, the result is typically a degraded playback of that media transmission. Such loss or delay tends to produce noticeable artifacts in the media playback as the encoded packets are decoded and combined for playback on the computing device.

Because lost packets can seriously degrade media playback, several schemes have been developed to address occasional packet loss. For example, several conventional schemes use an Automatic Retransmission Request (ARQ) which retransmits lost packets after the server receives a negative acknowledgement (NACK) from the client for any given packet. Unfortunately, ARQ-type schemes typically introduce unacceptable delays with respect to real-time transmissions such as two-way voice communications, for example. Further, such schemes begin to degrade rapidly as the packet loss ratio increases.

Another conventional scheme, Forward Error Correction (FEC) addresses the packet loss problem by transmitting redundant bits along with the data packets of the media file. These redundant bits are usually an arithmetic combination of original bits, and are used to recover or regenerate lost data packets by using the received data packets along with the redundant information to recreate lost packets. In other words, traditional FEC techniques transmit redundant information such that even if there are errors or losses in transmission, every bit is correctly received. The emphasis is not on what the bits mean, or how important each bit is, but on the primary goal of receiving every bit intact. Such schemes generally provide for a fairly reliable media transmission where the packet loss ratio is low. However, as the packet loss ratio increases, the ability of FEC schemes to recover lost packets quickly degrades, thereby again causing the playback of the media transmission to degrade. Further, because of delays inherent in many FEC-based schemes, and because of the additional bandwidth required by such schemes, the ability to use FEC to correct transmission errors is generally constrained with respect to real-time applications having limited bandwidth such as two-way speech or live media transmissions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Media Transmission Optimizer," as described herein, provides a novel form of dynamic Forward Error Correction (FEC) that focuses on the perceived quality of a recovered media signal rather than on the absolute accuracy of the recovered media signal. Unlike data transmissions, such as the bits of a computer program which must be received perfectly for the received program to run properly, minor errors in the received media signal are not as critical since the true measure is the playback quality of the final decoded signal rather than the absolute accuracy of that signal.

In other words, unlike conventional FEC-based media transmission techniques, the Media Transmission Optimizer operates to optimize the transmission of redundant information in electronic media for optimal playback quality. For example, when the bits of media (e.g., audio, video, etc.) are being prepared for transmission, the original information is generally already compressed using some lossy compression technique. Consequently, making sure every bit is received perfectly is not necessary; the true measure is the quality of the final decoded signal. This is particularly important for real-time applications such as two way speech (e.g., telephone or radio) and real-time media broadcasts, and for bandwidth limited transmissions including speech and/or video.

In order to optimize the real-time transmission of media, the Media Transmission Optimizer uses an adaptation of FEC-type techniques to send additional copies of the same frame of media, coded at different bitrates, in subsequent media packets as a means of protection against losses. In other words, each packet will contain representations of some number of consecutive frames of the media signal, with each consecutive frame being encoded at different bitrates. For example, assuming that the packets of an encoded signal include three consecutive frames (with Frame 3 being the most current frame, and Frame 1 being the oldest frame), that packet would include Frame 3 encoded at Rate 1, Frame 2 encoded at Rate 2, and Frame 1 encoded at Rate 3. The next packet would then include Frame 4 (being more current then Frame 3) encoded at Rate 1, Frame 3 encoded at Rate 2, and Frame 2 encoded at Rate 3.

Furthermore the different bitrates, and the total number of different bitrates, used for the various copies of the same frame of media are chosen prior to transmission, based on an analysis of the media (e.g., rate distortion curves) and/or channel (e.g., bandwidth and reliability), to optimize a final rate-distortion value (R/D) of the decoded signal in view of expected packet loses. In various embodiments, optimization is based on average signal statistics and/or optimization of the basis of individual frames to optimize the R/D value of the final decoded signal.

Once a sufficient number of the transmitted packets are received (which depends on the number of representations of frames being used to construct each transmitted packet), the receiver then determines an optimal path through the available representations of each frame to optimize the R/D of the playback of the recovered media transmission.

In view of the above summary, it is clear that the Media Transmission Optimizer described herein provides a unique system and method for optimizing the quality of received decoded media signals received across a lossy network such as the Internet. In addition to the just described benefits, other advantages of the Media Transmission Optimizer will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
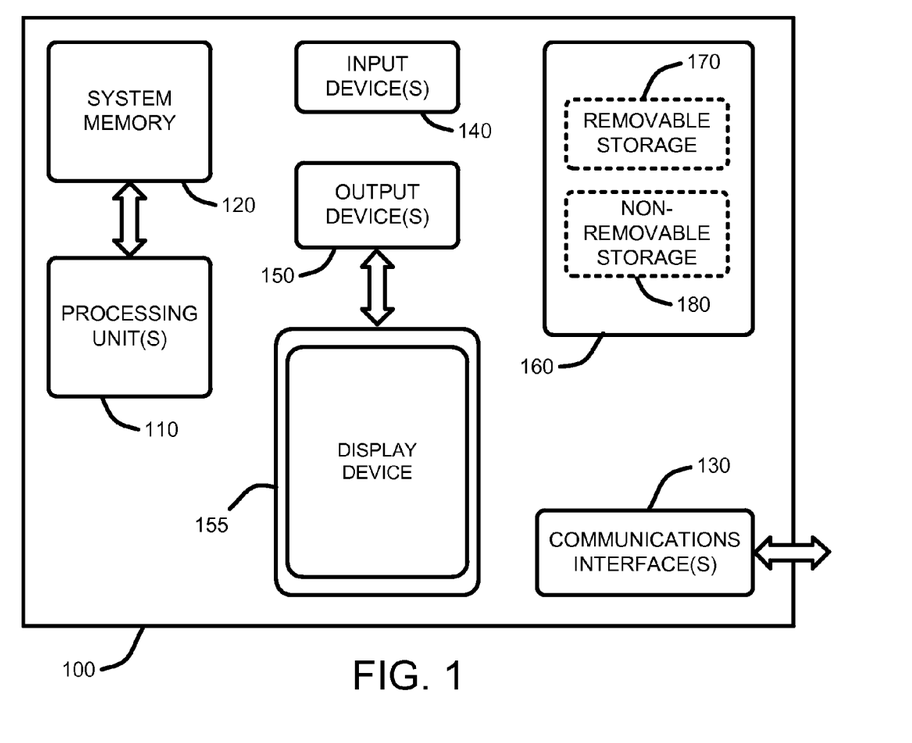
FIG. 1 is a general system diagram depicting a general-purpose computing device constituting an exemplary system for implementing various elements of a Media Transmission Optimizer, as described herein.

1.0 Exemplary Operating Environment:

FIG. 1 illustrates an example of a simplified computing environment on which various embodiments and elements of a "Media Transmission Optimizer," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document.

At a minimum, to enable a computing device to implement the "Media Transmission Optimizer" (as described in further detail below), the computing device 100 must have some minimum computational capability and either a wired or wireless communications interface 130 for receiving and/or sending data to/from the computing device using conventional communications channels (such as, for example, GSM-based cell phone networks, the Internet, wired network connections, wireless network connections such as IR, Bluetooth™, WiFi, etc.), and a removable and/or non-removable data storage for locally maintaining data.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

In fact, the invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones, PDA's, pocket PC's or media players, multi-processor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer or a computing device in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, one or more communications interfaces 130, one or more input and/or output devices, 140 and 150, respectively, and data storage 160 that is removable and/or non-removable, 170 and 180, respectively.

The communications interface 130 is generally used for connecting the computing device 100 to other devices via any conventional interface or bus structures, such as, for example, a parallel port, a game port, a universal serial bus (USB), an IEEE 1394 interface, a Bluetooth™ wireless interface, an IEEE 802.11 wireless interface, GSM cell phone network, etc. Such interfaces 130 are generally used to transfer information, data, or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, GPS receiver, radio receiver, and a television or broadcast video receiver, or the like. Conventional output devices 150 include elements such as a computer monitors or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying the "Media Transmission Optimizer."

2.0 Introduction:

In general, a "Media Transmission Optimizer," as described herein, provides rate/distortion (R/D)-based forward error correction (FEC) to facilitate real-time media transmissions between two or more computing devices (such as, for example, cell phones, PDA's, media players, computers, etc.) across inherently lossy or bursty networks such as the Internet. In other words, the Media Transmission Organizer provides a novel adaptation of traditional (error free) rate/distortion optimization criteria to present a solution which optimizes received media transmissions under a rate/distortion criterion considering expected packet transmission losses.

Note that the following discussion generally refers to real-time media transmissions between two or more computing devices as "real-time communication" or simply RTC. However, it should be understood that any reference to RTC provided herein is also intended to apply to near real-time communications having some relatively small maximum acceptable media transmission delay.

2.1 System Overview:

As noted above, the Media Transmission Optimizer described herein provides a technique which facilitates RTC between two or more computing devices across inherently lossy networks such as the Internet. RTC differs from traditional data transmission problems in two aspects. First, in real time communication, delay is extremely important. Second, the Media Transmission Optimizer is concerned with transmitting media (and not merely "bits" of a data file). Consequently, a distortion criterion is more appropriate than perfect data transmission.

In general, a sender of the Media Transmission Optimizer encodes multiple sequential frames of the media data at different bitrates, and then combines those multiple encoded frames into a single packet that is encoded and sent to a receiver where the frames are decoded to reproduce a version of the original media data. However, due to the expected unreliability of the transmission channel, some packets are expected to be lost (or delayed so long that they are treated as being lost).

Unlike traditional FEC codes, where the sender inserts bit-redundancy in the transmitted packets, the Media Transmission Optimizer inserts signal redundancy. More specifically, it sends multiple encodings (possibly at different bitrates) of the same frame so that in case of packet loss, another packet containing the same data, but at a different quality level (different bitrate), is used to recover the loss. In particular, each packet generated by the Media Transmission Optimizer includes an appropriate representation of the current frame, along with coarser representations of one or more previous frames. Clearly, there is a tradeoff between attributing rate to redundant information instead of to the current frame. However, by increasing the amount of redundant information, the probability and the quality of loss recovery is improved while sacrificing from the quality of the most recent frame.

In general, the problem is that, given a model for the transmission channel (e.g., the Internet) and a total available transmission rate R, find an optimum partition of the bit budget between redundant and current frames such that a distortion measure $D_T$ of the received signal is minimized. Each frame represents a signal segment, and each packet contains information units representing two or more consecutive frames. In various embodiments, these "units" are either raw data, or are some encoded representation of data derived by a conventional compression algorithm (e.g. LPC coefficients, prediction errors, compressed video frames, etc.). Note that the term "unit" as used throughout this discussion is intended to refer to frames, either raw or encoded using some encoding technique, that are included in the packets of the media signal being transmitted.

In particular, each packet is modeled as a collection of multiple units corresponding to different consecutive segments of the media signal, each unit having a different rate from the rates of other units in the packet (which depends on an evaluation of the signal characteristics and the available bandwidth, as described in further detail in Section 3). For each packet, $r_1$ is the rate of the present segment and $r_i$ is the rate of (i−1)th past segment. In various embodiments, the number of units in each packet, and the rate at which each unit is encoded of each unit is either determined by an automatic optimization evaluation prior to transmission, or is adaptively changed based on changing characteristics of input signal over time. In various embodiments, changing channel characteristics (such as in increase or decrease in available bandwidth or transmission loss rates) are also considered in determining the number of units in each packet, and the rate at which each unit is encoded.

Figure 2:
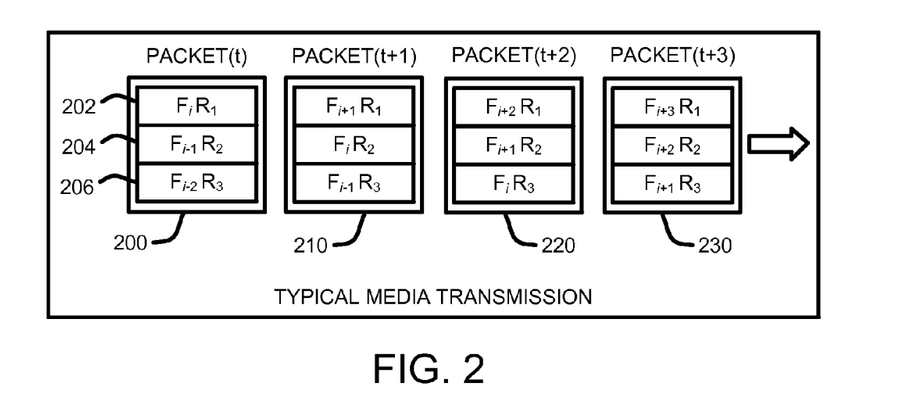
FIG. 2 illustrates packet construction showing each packet including a representation of a current media frame in addition coarser level representations of N immediately preceding frames of a media signal, as described herein.

For example, FIG. 2 provides a simple illustration of a media transmission of four consecutive packets 200, 210, 220, and 230 at times (t) through (t+3), with each packet carrying information about the current frame (encoded at rate $r_1$), as well as lower fidelity information about the two previous packets, (encoded at rates $r_2$ and $r_3$, respectively). For example, the media packet 200 at time (t) includes a first frame 202 of the media signal from time (t) encoded at rate $r_1$, a second frame 204 of the media signal from time (t−1) encoded at rate $r_2$, and a third frame 206 of the media signal at time (t−2) encoded at rate $r_3$. Each successive packet 210, 220 and 230, are similarly constructed with the current frame (at times (t+1), (t+2), and (t+3), respectively) and the two immediately preceding frames.

In addition to constructing packets from successive frames encoded at different bitrates, in various embodiments, each unit of each packet is dependent on previous units (i.e., differential coding). Both the independent cases and dependent cases are described in further detail in Section 3. Examples of independent units or frames include encoding video with an all I-frames, or encoding speech using G.722.1 ("siren") or G.711 (PCM). Examples of dependent units or frames include encoding the media signal using history dependent algorithms where each segment to be sent as a unit is constructed based on the history of the preceding data, such as with conventional codecs including ADPCM, H-264, etc.

Figure 3:
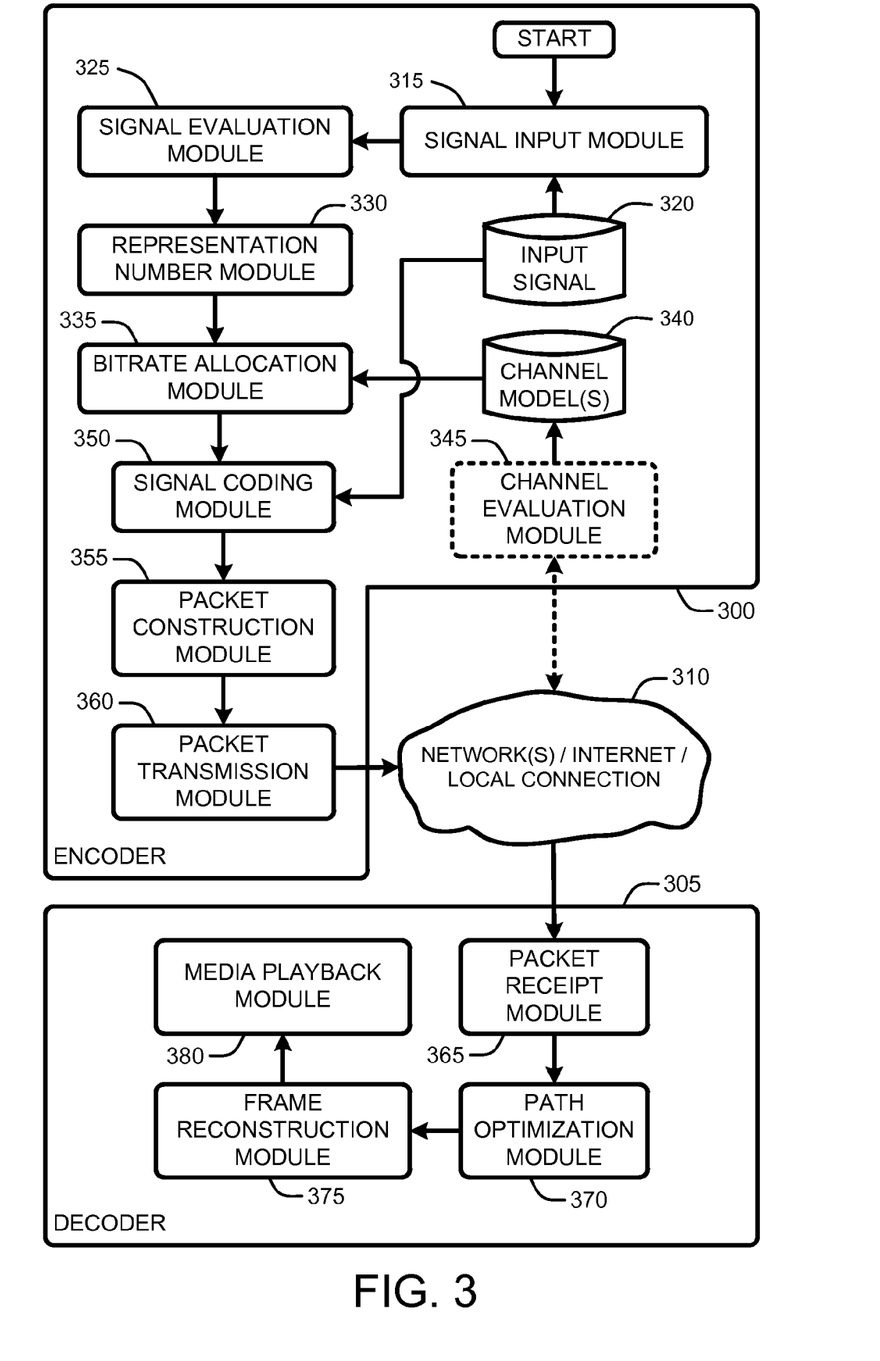
FIG. 3 illustrates an exemplary architectural system diagram showing exemplary program modules for implementing various embodiments of the Media Transmission Optimizer, as described herein.

2.2 System Operational Overview:

The processes summarized above are further illustrated by the general system diagram of FIG. 3. In particular, the system diagram of FIG. 3 illustrates the interrelationships between program modules for implementing the Media Transmission Optimizer, as described herein. It should be noted that any boxes and interconnections between boxes that are represented by broken or dashed lines in FIG. 3 represent alternate embodiments of the Media Transmission Optimizer described herein, and that any or all of these alternate embodiments, as described below, may be used in combination with other alternate embodiments that are described throughout this document.

In general, as illustrated by FIG. 3, the Media Transmission Optimizer operates by optimizing the transmission of redundant information in electronic media and for providing optimal playback quality by allowing the decoder to select an optimal path through one or more available representations of each frame as a function of overall rate/distortion criteria. The resulting system (which includes an encoder and a decoder) enables real-time transmissions or two-way communications between two or more computing devices. It should be noted that in the case of real-time two way or multi-party communications, particular computing devices (including cell phones, PDA's, media players, computers, etc.) can act as both an encoder/sender for transmitting media signals to one or more other devices, and a decoder/receiver for receiving media signals from one or more other devices.

As illustrated by FIG. 3, the Media Transmission Optimizer includes an encoder 300 and a decoder 305 that are in communication across a network 310 such as the Internet. Operation of the Media Transmission Optimizer begins by using a signal input module 315 of the encoder 300 to receive a live or real-time input signal 320 from a conventional signal input source (microphone, camera, etc.) A signal evaluation module 325 then examines the input signal to determine signal parameters, such as signal type, characteristics, etc., as described in further detail in Section 3.

A representation number module 330 then determines an optimal number N of frame representations to be constructed for each signal frame based on an evaluation of the signal parameters and the channel model. A bitrate allocation module 335 then evaluates one or more channel models 340 to determine an optimal division of the available bandwidth between N representations of N sequential frames of the input signal 320. In various embodiments, the channel models 340 are either predefined, or determined either at transmission time, or on an ongoing basis during signal transmission by using a channel evaluation module 345 to examine actual characteristics of the transmission channel across the network 310.

Once both the number of representations are known, and the available bandwidth has been allocated into a set of bitrates for each of the representations, a signal coding module 350 simply encodes each frame of the input signal 320 at each of the N rates. Note that this encoding is performed in real-time as each incoming frame of the input signal is received by the encoder 300.

A packet construction module 355 creates packets for transmission by stacking or otherwise grouping one representation from each of up to N sequential current and previous frames to form the packet. In particular, the highest rate representation of the current frame is included in the packet along with representations of up to N−1 preceding frames, which are included in sequentially decreasing rates of representation. For example, assuming that N=3, and that $r_1 > r_2 > r_3$ (the N rates at which every frame is encoded), then every current packet will consist of the current frame ($F_i$) encoded at rate $r_1$, the frame ($F_{i-1}$) immediately preceding frame ($F_i$) encoded at $r_2$, and the frame ($F_{i-2}$) immediately preceding frame ($F_{i-1}$) encoded at $r_3$, and which immediately precedes frame. Another way to look at this packet is that it includes the following data $F_i(r_1)$, $F_{i-1}(r_2)$, and $F_{i-2}(r_3)$. The next packet would then include $F_{i+1}(r_1)$, $F_i(r_2)$, and $F_{i-1}(r_3)$, and so on.

As soon as each packet is constructed by the packet construction module 355, it is transmitted by a packet transmission module 360 across the network 310. Each transmitted packet that is not lost in the network 310 arrives at the decoder 305 where it is received by a packet receipt module 365. The packet receipt module 365 passes each received packet to the path optimization module 370, which extracts from the packet each of the available representations of the N (or fewer) frames in the packet. Path optimization module 370 then begins to determine an optimum path through the N or fewer choices of representations of each frame on an ongoing basis as every new frame is received (or assumed lost). Determination of a path as being optimum is based on an R/D evaluation of the signal that will result from decoding a particular sequence of representations of any current and past frames. Note that this concept is described in greater detail in Section 3, and a specific example of this optimum path selection is illustrated with respect to FIG. 6 in Section 4.

Finally, as soon as the path optimization module 370 identifies a particular representation of a frame as being on the optimum path, a frame reconstruction module 375 decodes that frame representation to reconstruct the corresponding frame or segment of the media signal and provides that frame/segment to a media playback module 380 for immediate playback using conventional media playback techniques (speakers and/or display device) depending on the signal type (audio, video, or mixed audio video).

3.0 Operational Details of the Media Transmission Optimizer:

The above-described program modules are employed for implementing the Media Transmission Optimizer described herein. As summarized above, this Media Transmission Optimizer provides a system and method for optimizing the transmission of redundant information in electronic media and for providing optimal playback quality by allowing the decoder to select an optimal path through one or more available representations of each frame as a function of overall rate/distortion criteria. The following sections provide a detailed discussion of the operation of the Media Transmission Optimizer, and of exemplary methods for implementing the program modules described in Section 2. In particular, the following paragraphs describe independent encoding of sequential frames; encoding of sequential frames using variable R/D curves; consideration of inter-dependent data packets when encoding sequential frames; and quality maximization considerations.

3.2 Independent Encoding of Sequential Frames:

In the simplest optimization case, each frame is encoded independently of neighboring frames. In this case, the optimal rate of each packet is chosen to minimize the average distortion given an actual or estimated loss model of the transmission channel.

For purposes of explanation, a very simple case is described below in Section 3.2.1. In order to introduce this very simple case, a number of broad assumptions are made. In particular, to describe this first case, it is assumed that there is only a single rate distortion function for the media signal (i.e., the same R/D curve is used for every frame), the bitrate allocation is fixed (i.e., independent of the actual signal), the loss model is i.i.d. (independent and identically distributed), and maximum transmission delay is ignored. Note that following the discussion of this first simple case, more complex packet construction scenarios are described.

3.2.1 Simple Independent Packet Construction:

Assuming that the codec being used to encode frames of the media signal does not use an inter-frame coding technique, and that a fixed rate-distortion function $D(r)$ is used, then the distortion $D(r)$ is simply the average distortion due to using rate r for a generic compression algorithm using only data in the current frame.

For example, suppose there are 3 units in each packet as illustrated in FIG. 2, and that the packet loss is an i.i.d. Bernoulli process having a loss probability p. Since the loss event is i.i.d., and the R/D curve is the same across packets, the rates $r_1$, $r_2$, and $r_3$ will also be the same across packets. In this case, an optimum solution is to require $r_1 \geq r_2 \geq r_3$, and the decoder simply uses the first packet received, even though the decoder may receive multiple units (at different rates) for the same segment of the media signal.

The probability of a packet being received is $(1-p)$. Further, if a packet is received, and the unit or frame encoded at $r_1$ contained in that packet is used for reconstruction of the corresponding frame, then the distortion for the reconstructed frame is simply $D(r_1)$ with probability $(1-p)$. However, there is a probability p that this packet is not received. In that case, it is necessary to wait for the next packet, which contains the same frame, but coded at rate $r_2$. That packet has itself probability $(1-p)$ of being received. Therefore, the probability that the data contained in that packet will be used to reconstruct the frame in question is $p(1-p)$, and in that case the distortion is simply $D(r_2)$. Similarly, considering the third packet, it is easy to see that that the distortion contributed by that packet is given by $p^2(1-p)D(r_3)$. Finally, if none of the three packets containing information about the current frame is received, some other conventional loss concealment technique will be used, which it is assumed will itself induce a distortion K. The same computation will hold for any particular segment (or frame) of the media signal. Therefore, assuming that each packet includes the current frame in addition to representations of the two immediately preceding frames, the expected total distortion $D_T$ at any time is given by Equation (1), where:

$$D_T=(1-p)D(r_1)+p(1-p)D(r_2)+p^2(1-p)D(r_3)+p^3 K \quad \text{Equation (1)}$$

Again, as noted above, the distortion K directly depends on the loss concealment technique being used, and it is assumed to be comparable to $D(0)$. Consequently, if delay is not considered, the optimization problem can be formulated as illustrated by Equation (2) where:

$$\min_{r_1,r_2,\ldots,r_N,N} D_T(r_1,\ldots,r_n), \; s.t. \sum_{i=1}^{N} r_i < R \quad \text{Equation (2)}$$

where N is the total number of units (frames) to be used and R is the total channel transmission rate being used. Since it is assumed that there in no inter-frame coding in this example, the R/D curves are the same for the first unit and for the subsequent (FEC) units.

Figure 4:
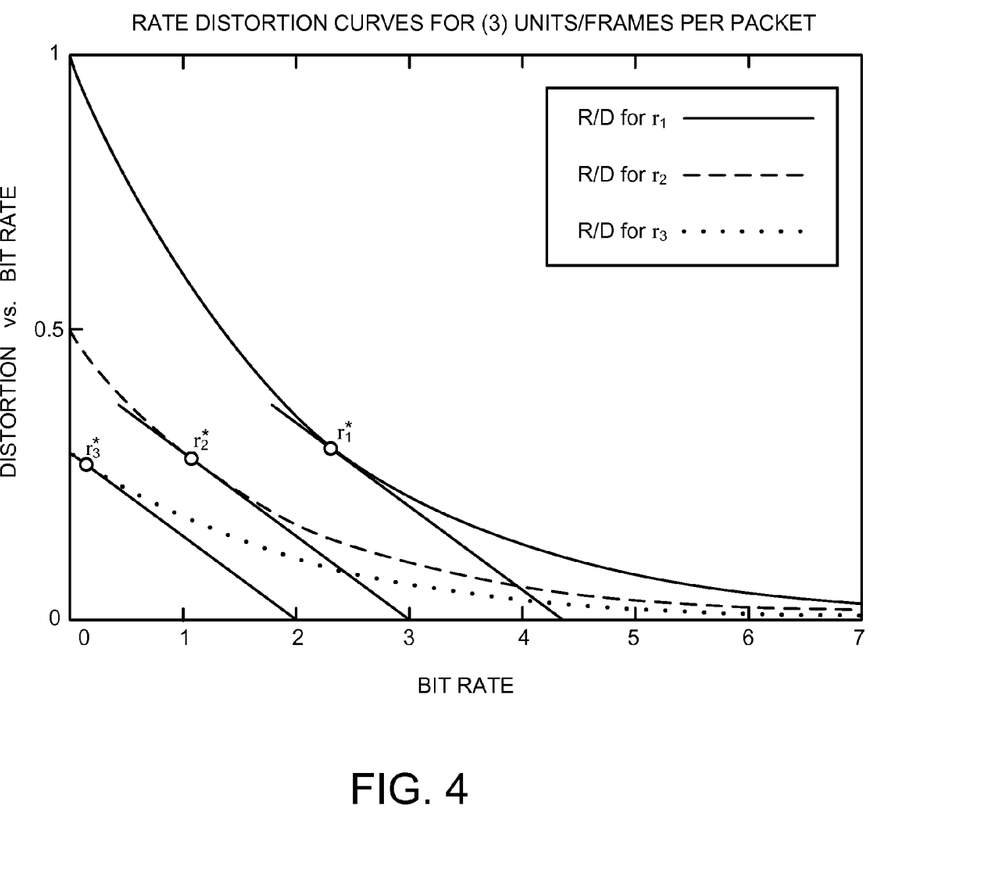
FIG. 4 illustrates an example of a set of Rate/Distortion curves vs. bitrate.

An example of this point is provided in FIG. 4, which illustrates the distortion contribution of each unit at each corresponding rate in accordance with Equation (1). Note that as illustrated by FIG. 4, the curve corresponding to each unit has the same shape (assumes single distortion curve, as noted above), but has been appropriately scaled by the associated probability, as prescribed by Equation (1). In this example, the total distortion DT is the sum of the three different distortion values, one selected from each of the three R/D curves. Each curve is simply the product of $D(r)$ and respective probability coefficient coming from the channel model. Therefore, given N, the problem (for convex rate distortion functions such as those illustrated in FIG. 4) is formulated as an unconstrained optimization using Lagrange multipliers as illustrated in Equation (3), where:

$$\min_{r_1,r_2,\ldots,r_N,N} D_T(r_1,\ldots,r_n) + \lambda \sum_{i=1}^{N} r_i < R \quad \text{Equation (3)}$$

where $\lambda$ is the Lagrange multiplier. Consequently, the optimal configuration is reached when:

$$\frac{\partial D_T}{\partial r_1} = \frac{\partial D_T}{\partial r_2} = \frac{\partial D_T}{\partial r_3} \quad \text{Equation (4)}$$

Since it is assumed in this first example that the encoding of each unit is independent (no inter-frame coding), the partial derivatives are simplified to $$\left.\frac{\partial D_T}{\partial r}\right|_{r_1} = \left.\frac{\partial D_T}{\partial r}\right|_{r_2} = \left.\frac{\partial D_T}{\partial r}\right|_{r_3} \quad \text{Equation (5)}$$

In other words, the problem in this first example is reduced to finding the optimum rate points $r_i^*,\ldots,r_n^*$ such that the slopes of the scaled rate distortion curves are the same at each $r_i^*$ and $\sum_{i=1}^{N} r_i^* \leq R$. This is illustrated in FIG. 4.

Note that whenever N (e.g., the number of representations of units/frames in each packet) is not given a priori, it must be included as a parameter in the optimization. In principle, the induced delay is N, because to present the frames at a constant rate, the receiver has to wait for the N packets (to be received or partially lost) before decoding a frame. Since Equation (1) does not include any penalty for latency, the optimization in Equation (3) artificially favors large values of N. However, even if there is no penalty for latency, there is always a finite value of N where the optimization evaluation favors the quality over error recovery. In particular, defining the ordered curves in FIG. 4 as $D_1, \ldots D_i$ (where i=3 in this case), then the optimal number of units to be included in each packet will be upper bounded as illustrated by Equation (6), where:

$$N^* = \underset{N}{\operatorname{argmax}} \sum_{i=1}^{N} \hat{D}_i^{-1}(\hat{D}_N(r=0)) \leq R \qquad \text{Equation (6)}$$

where $\hat{D}_i(r)$ is the derivative of the function $D_i(r)$ and $\hat{D}_i^{-1}(r)$ is the inverse of $\hat{D}_i(r)$. After getting an upper bound, N can be computed by decreasing N and re-computing the distortion until $D_T$ starts to increase. Since N is generally small, this exhaustive search in N is usually not a problem.

3.2.2 Independent Packet Construction for Burst Packet Losses:

In the example described in Section 3.2.1, it was assumed that that the probability of a packet loss is independent of the previous loss event. Unfortuntely, with lossy networks such as the Internet, this is usually not the case, and packet losses often come in bursts. While any desired burst loss model can be used here, one commonly used model for bursty packet loss is the well known two-state Markov probability loss model. In this case, the ordering of the rates in the packet structure is significantly more important than in the preceding example.

For example, although not optimal, assume that the first packet received for a particular frame is always used to reconstruct that frame. In this case, the total distortion function DT is given by Equation (7), where:

$$D_T = (1-p_L)D(r_1) + p_L(1-p_0)D(r_2) + p_L p_0(1-p_0)D(r_3) + p_L p_0^2 K \qquad \text{Equation (7)}$$

where $P_L$ is the stationary loss probability, and $p_0$ is the loss probability after a loss event.

On the other hand, to achieve an optimal $D_T$ for the decoded signal, the decoder can decide not to use the first packet received for reconstructing a particular frame, so the probabilities may be different than illustrated with respect to Equation (7). However, the distortion function is still the sum of 3 distortion points selected from the curves, where each curve is scaled by a corresponding probability coefficient. Consequently, any change in the channel model merely affects the coefficients of the distortion curves in the expected distortion function. As a result, a modified Equation (1) can still be used as the expected distortion for the Markov case (burst losses) by simply adjusting the probability multipliers of Equation (1).

Even for more complex channel models, the only modification is that different packets have different receiving probabilities. For the Markov loss model with bursty losses, it is clear that if the first packet is lost, the farthest one is the next one with highest probability of being received. That is why for bursty loss channels, it is beneficial to favor units with higher delay, instead of simply using the adjacent segment. This phenomena is directly reflected in Equation (7), such that if the channel is bursty, then the distortion curves of units further down in the packet (e.g., the unit at rate $r_3$ is further down than the unit at rate $r_2$) will be above the curves of adjacent packets (and are therefore assigned a higher rate). In other words, after computing the use probability of each packet, optimization is determined as illustrated by Equation (8), by setting:

$$\left.\frac{\partial D(r)}{\partial r}\right]_{r_1} = \left.\frac{\partial p_2 D(r)}{\partial r}\right]_{r_2} = \left.\frac{\partial p_3 D(r)}{\partial r}\right]_{r_3} \qquad \text{Equation (8)}$$

where $p_2$ and $p_3$ are the probability that units 2 and 3 are used, respectively.

3.3 Encoding of Sequential Frames Using Variable R/D Curves:

In the preceding two examples (see Sections 3.2.1 and 3.2.2), it was assumed that the packet structure was independent of the actual data being transmitted with respect to actual rate distortion curves. However, better performance can be obtained if the packet configuration is adaptive such that, for each transmission, the packet structure is selected depending on the actual data.

In particular, as with the immediately preceding example, given some packet loss model, the transmitter again computes the probability of the decoder receiving each packet. Then, instead of using the average D(r), the encoder computes the actual $D_i(r)$ function for each frame i. Then, the same optimization described in Section 3.2.2 is performed. However, in this case, the actual distortion curves for the current and past frames is used instead of using predetermined or predefined distortion curves as with the preceding examples.

Clearly, this type of optimization requires more computational overhead, as the distortion curves are evaluated on an ongoing basis. However, in the case when the encoder has only a few operating points (or rates), the computational overhead required is typically easily handled by conventional computing devices (cell phones, media players, computers, etc.). Further, to reduce computational overhead, in various embodiments, an approximation of the distortion curves can be made by using a simpler partitioning of the data.

For example, voiced and unvoiced media signals typically have significantly different rate/distortion curves. In this case, it is straightforward to pre-compute separate rate distortion curves, $D_v(r)$ and $D_u(r)$, for voiced and unvoiced frames respectively, or even a third rate distortion curve, $D_m(r)$ for mixed (voiced and unvoiced) frames. In a related embodiment, the rate distortion curves are computed on an ongoing basis as a function of the actual media signal being transmitted, or as some moving average of that signal. Then, at transmittal time, each frame is simply classified as voiced, unvoiced, or mixed (which is often already done by conventional codecs). This classification, along with the corresponding R/D curves are then used to optimize the FEC bit rate allocation for the different rate versions of each frame used to construct the packets to be transmitted.

3.4 Inter-Dependent Data Packets:

In the examples described in Section 3.2 and 3.3, it was assumed that encoding and decoding of each frame was independent of previous packets. While this has allowed the simple optimization solutions described above, independency of adjacent frames is not always applicable in real-world media transmissions. In fact, as is well known to those skilled in the art, audio and video transmissions typically present significant redundancy between subsequent segments of media. Many conventional codecs use this characteristic of media signals to increase compression through the use of inter-frame coding techniques.

For example, conventional speech codecs often send differential LPC coefficients, while video codecs often make extensive use of motion compensation. This type of frame interdependency is easily handled by the Media Transmission Optimizer as described in further detail below. In particular, the Media Transmission Optimizer may model history-dependent algorithms as Markov chains such that the unit for each segment depends only on the most recent unit. However, since each unit is interdependent, a unit loss or replacement in the receiver will not only affect the reconstruction of the current frame but also the reconstruction of one or more successive frames, and this has to be taken into consideration, as explained below.

In particular, assume that the packet structure described above with respect to FIG. 2 is used, with different rates for each unit, as in the independent unit case described above. Further, assume that the redundant data of the preceding frames is encoded at lower rates (e.g., $r_2$ and $r_3$). Then, assume a single packet loss at time (t) for frame N. In this case, the decoder will use the representation for frame N with rate $r_2$ instead of the (higher fidelity) version with rate $r_1$ that was transmitted with the lost packet. Then, decoding the next frame, frame N+1 (received at rate $r_1$) depends on the decoded frame N (received at rate $r_2$). Clearly, there will be a mismatch between the transmitted frame and the decoded frame. This will cause additional distortion, which will propagate to subsequent frames. Consequently, the selection and construction of the redundant coding rates $r_2$ and $r_3$ needs careful consideration to reduce the distortion due to rate mismatch both in the present and following segments. The Media Transmission Optimizer addresses this issue in different embodiments, as described in detail in the following Sections.

3.4.1 Quality Maximization with No Losses:

In one embodiment, the Media Transmission Optimizer maximizes the quality of the decoded signal when there are no losses. For example, assume for purposes of explanation that N=2 for constructing two representations of each frame at different rates. In this case, each redundant unit is encoded by using the state provided by the highest quality version of the previous frame. The coder of the Media Transmission Optimizer generates frames at rate $r_1$, as if there was no FEC. Then, for each frame, the coder also generates another frame at rate $r_2$ which will be sent in the next packet. In case of a packet loss at time t, the information at rate $r_2$ in the next packet (received at time t+1) is then used to synthesize the frame at time t.

For most of the codecs, the loss of information due to this one sided mismatch is not severe. For 2-unit packets, the corresponding total distortion for i.i.d. packet loss with probability p is given by Equation (9), where:

$$D_T=(1-p)D(r_1)+p(1-p)(D(r_2)+D_p^{r_2 \to r_1}(r_1))+p^2 K \qquad \text{Equation (9)}$$

where $D_p^{r_2 \to r_1}(r_1)$ is the propagated distortion caused when the lost unit with rate $r_1$ is replaced by a unit encoded at rate $r_2$. Note also that K now also has to include the effects of the same error propagation. Unlike the independent unit case described above, the partial derivative of the average distortion $D_T$ in Equation (9) with respect to rate $r_i$ depends not only $r_i$ but also on the rates used for encoding the other units.

The complexity of this issue could make the optimization problem effectively untreatable. However, by isolating all the additional distortion in the term $D_p^{r_2 \to r_1}(r_1)$, it is easy to solve the optimization problem for cases where there are a limited number of operating points (e.g., the total number of frame representations used). Similarly to the expected distortion, this term can be computed beforehand for its expected value.

3.4.2 Quality Maximization by Minimization of Propagation Errors:

In yet another embodiment, the Media Transmission Optimizer maximizes the quality of the decoded signal by minimizing propagation errors. For example, assume for purposes of explanation that N=2 for constructing two representations of each frame at different rates. In this embodiment, the coder of the Media Transmission Optimizer uses 2 independent layers to generate 2 independent trails of units. In other words, the bit rates for each representation are selected to provide two alternate and independent paths through the representations of frames received by the decoder (note that the number or paths will increase with the number of representations used).

Since each unit contains a representation of the immediately preceding unit in the same packet, there is no immediate state loss when there is single packet loss. Consequently, the interrupted trail can be either abandoned for a while (e.g., until next intra-frame), or can be used after reconstruction of one or more frames has reduced the decoder mismatch. In other words, the decoder picks the best path through the received representations of frames to minimize error propagation. Consequently, the Media Transmission Optimizer significantly reduces error propagation due to packet replacement. However, there is a small quality penalty, since the decoder builds its memory by combination of rates $r_1$ and $r_2$ instead of only rate $r_1$. For a 2 packet structure the total distortion is given by Equation (10), where:

$$D_T=(1-p)D^{r_1,r_2}(r_1)+p(1-p)D^{r_1,r_2}(r_2)+p^2 K \qquad \text{Equation (10)}$$

where $D^{r_1,r_2}(r_1)$ is the distortion of rate $r_1$ and $D^{r_1,r_2}(r_2)$ is the distortion of rate $r_2$ when the $(r_1, r_2)$ combination is used. Note also that in Equation (10) any remaining drifting in the recovered signal was ignored. However, in further embodiments, a consideration of drifting is included in the optimization.

The choice between the optimization methods described in Section 3.4.1 and 3.4.2 will depend heavily on the characteristics of the codec, and of the channel. For example, in a tested embodiment of the Media Transmission Optimizer, real-time transmissions of speech over low-loss channels tends to produce better results using the embodiment described in Section 3.4.1. Conversely, real-time transmission of video over high-loss channels tends to produce better results using the embodiment described in Section 3.4.2.

Figure 5:
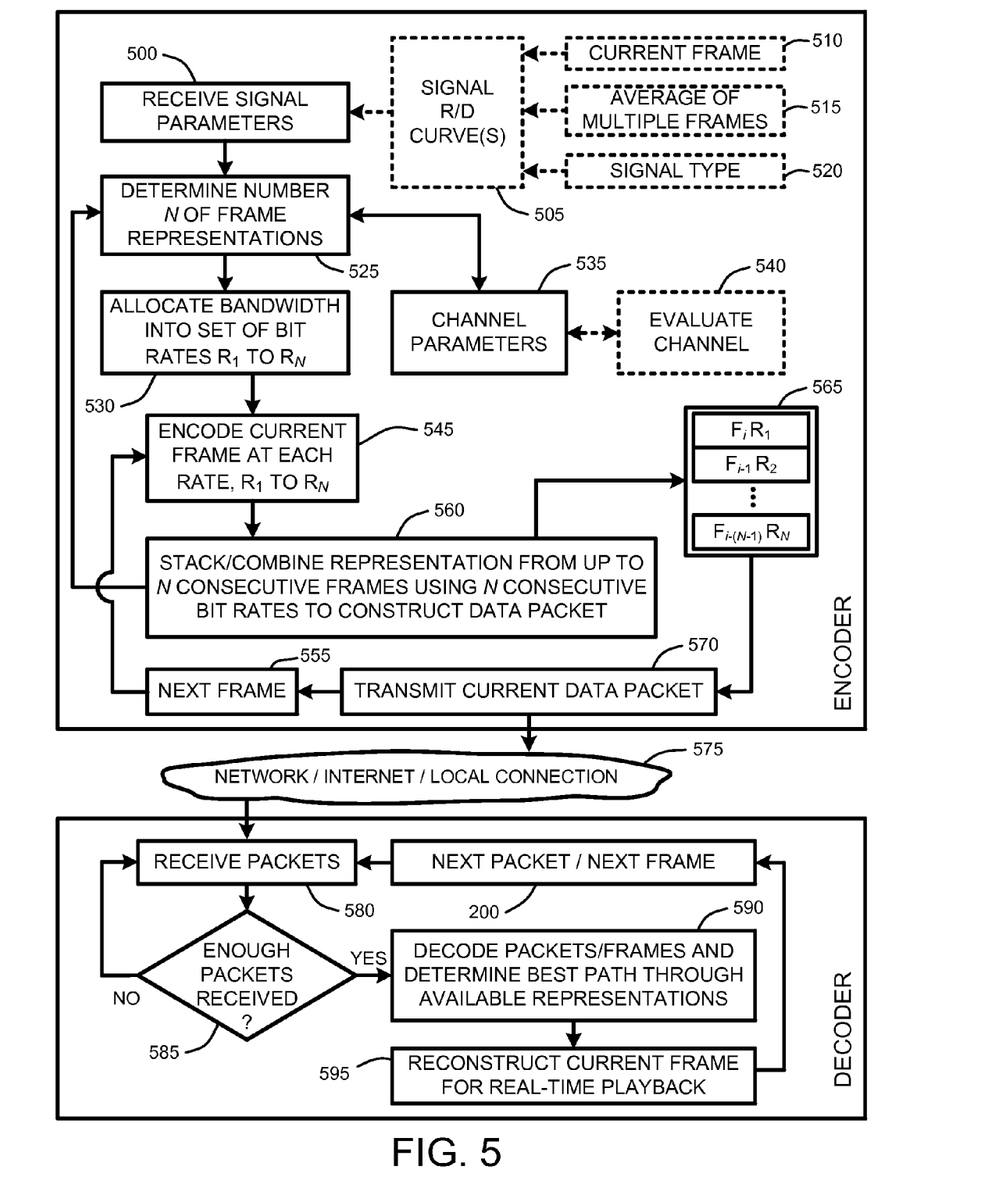
FIG. 5 illustrates an exemplary system flow diagram for implementing various embodiments of the Media Transmission Optimizer, as described herein.

4.0 Media Transmission Optimizer Operational Overview:

The processes described above with respect to FIG. 3, and in view of the detailed description provided in Sections 2 and 3 are generally summarized by the operational flow diagram of FIG. 5. In particular, FIG. 5 illustrates an exemplary operational flow diagram which provides an overview of the operation of various embodiments of the Media Transmission Optimizer. It should be noted that any boxes and interconnections between boxes that are represented by broken or dashed lines in FIG. 5 represent alternate embodiments of the Media Transmission Optimizer described herein, and that any or all of these alternate embodiments, as described below, may be used in combination with other alternate embodiments that are described throughout this document.

In general, as illustrated by FIG. 5, in one embodiment, operation of the coder side of the Media Transmission Optimizer begins by receiving 500 signal parameters of the media signal to be transmitted. As described above, in various embodiments, these signal parameters include the type of media signal (voiced, non-voiced, mixed, video, etc.), and also includes one or more R/D curves 505. As discussed above, R/D curves can be computed 510 for each frame, computed as an average 515 over multiple frames, or predefined 520 as a function of signal type.

Once the signal parameters have been received by the coder, the Media Transmission Optimizer determines 525 an optimum (or predefined) number N of frame representations to be used as a joint function of R/D of the media signal and transmission channel parameters 535. Given the number N of frame representations, the Media Transmission Optimizer then allocates 530 the bandwidth available for transmission into a set of N bitrates, with one rate for each of the N frame representations. In making bitrate allocations 530, the Media Transmission Optimizer considers the channels parameters 535, either as a function of a predefined channel model, or by directly evaluating 540 the channel either at the beginning of media transmission, or as a periodic or ongoing basis during transmission.

Given the set of bitrates and the number N of representations for each frame, the coder then encodes 545 the current frame of the media signal at each of the N rates. The ith packet 565 is constructed 560 using one representation from each of up to N frames, including the current frame and the N−1 immediately preceding frames to populate each of the bitrates (see discussion of FIG. 2 for an example). However, it should be noted that while the encoder can wait for N frames to be encoded before constructing 560 packets 565, this may introduce an unacceptable frame delay into the system. As a result, in one embodiment, the first N−1 packets will include from 1 to N−1 frames, respectively, when those packets are constructed 560. After that, all newly constructed 560 packets 565 will include a full set of N frame representations, (a high rate representation of the current frame and successively lower rate representations of the immediately preceding N−1 frames).

Once constructed, each packet 565 is then transmitted 570 across the network 575 to a decoder which receives packets from the coder side of the Media Transmission Optimizer. Note that for each subsequent packet, only one new frame 555 needs to be encoded, since each subsequent packet overlaps the preceding packet by up to N−1 frames (but with different bitrates), as discussed above. This encoding 545, packet construction 560, and packet transmission 570 then continues for as long as media is being transmitted from the coder to the decoder.

In the mean time, once the decoder receives 580 one or more packets 585 (or determines that one or more packets have been transmitted, some of which have been lost), the decoder decodes the received packets, and determines 590 an optimum R/D-based path through the available (actually received) representations of each frame (see example below with respect to FIG. 6). Frames corresponding to the best path through the received representations are then decoded and used to reconstruct 595 the corresponding frame for immediate playback of the corresponding segment of the received media signal. As with the encoder, every new packet that is either received (or lost) allows the decoder to continue decoding packets and determine 590 an optimum R/D-based path through the available (actually received) representations of each frame and reconstruct 595 the corresponding frame for immediate playback so long as the encoder continues transmitting 570 new packets to the decoder.

Figure 6:
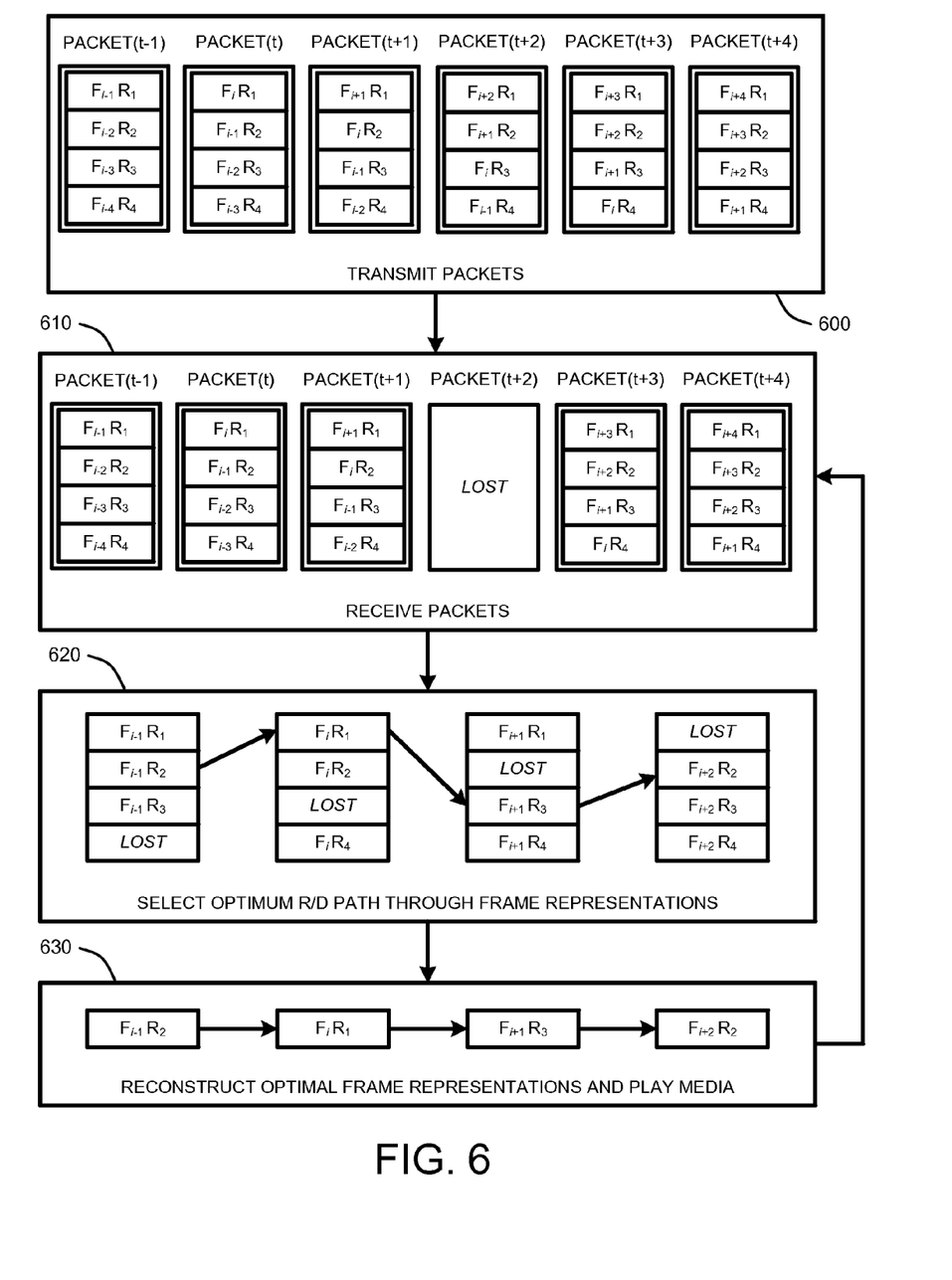
FIG. 6 illustrates a high level overview of media packet construction, transmission, and optimal path selection for decoding transmitted media signals, as described herein.

FIG. 6 illustrates a high level overview of the processes described above, in the steady state in which the encoder has encoded at least N frames and transmitted at least N packets to the receiver. The decoder receives 610 N or fewer of the transmitted packets. The decoder then evaluates the actually received representations of each frame to select 620 an optimum R/D-based path through those frame representations. The frames corresponding to the selected optimum path are then used to reconstruct 630 the corresponding segments of the original transmitted media signal for immediate playback.

The foregoing description of the Media Transmission Optimizer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Media Transmission Optimizer. It is intended that the scope of the invention be limited not by this detailed description, but rather by the claims appended hereto.

What is claimed is:

1. An encoder for constructing data packets for real-time transmission, comprising:
receiving a real-time input of sequential data frames comprising a media signal;
determining for each frame of the media signal a variable number N, wherein N is at least two, of representations and a set of N bitrates that divides available bandwidth of a lossy network communications channel, and wherein N is selected to minimize a rate distortion of an encoding of the media signal in view of expected network packet losses;
encoding every frame of the media signal at each of the N bitrates to construct N representations of each frame of the media signal; and
after each frame of the media signal is encoded, constructing a composite data packet that includes one representation of the current frame, and one representation of as many of the preceding N−1 sequential frames as are available.

2. The encoder of claim 1 further comprising transmitting the composite data packet to a decoder across a network.

3. The encoder of claim 1 wherein determining the variable number N of representations and set of N bitrates comprises evaluating signal characteristics of the media signal in combination with the available bandwidth.

4. The encoder of claim 3 wherein the variable number N and the set of N bitrates are chosen to maximize a playback quality of a media signal reconstructed from transmitted data packets received by a decoder by assuming data packet losses during transmission consistent with a channel model of the lossy network communications channel.

5. The encoder of claim 3 wherein the signal characteristics include one or more rate-distortion (R/D) curves corresponding to content of the media signal.

6. The encoder of claim 3 wherein the signal characteristics are evaluated as a function of average statistics derived from the signal content.

7. The encoder of claim 3 wherein the signal characteristics are periodically evaluated as a function of signal characteristics derived from one or more frames of the media signal.

8. The encoder of claim 1 wherein the bitrates of the set of N bitrates are automatically selected to maximize a final rate-distortion (R/D) curve of a media signal reconstructed from transmitted data packets received by a decoder by assuming data packet losses during transmission consistent with a model of a channel used for transmitting the data packets to the decoder across the network.

9. A computer readable medium, excluding carrier waves, having computer executable instructions stored thereon for constructing encoded data packets of a media signal for transmission to a decoder, comprising instructions for:
segmenting a real-time media signal into sequential frames of data; determining for each frame a variable number N, wherein N is at least two, of bitrate representations and a set of N bitrates, each bitrate representing a different signal quality, by evaluating signal characteristics of the media signal in combination with an available transmission bandwidth, and wherein N is selected to minimize a rate distortion of an encoding of the media signal in view of expected network packet losses; encoding every frame of the media signal at each of the N bitrates to construct N representations of each frame of the media signal; after each frame of the media signal is encoded into N bitrate representations, constructing an encoded data packet by combining a highest available bitrate representation of the current frame, and a single lower bitrate representation of each of as many of the preceding N−1 sequential frames as are available; and transmitting each encoded data packet to a decoder as soon as each data packet is constructed.

10. The computer readable medium of claim 9 wherein the media signal represents a signal that includes speech.

11. The computer readable medium of claim 9 wherein the media signal represents a signal that includes video.

12. The computer readable medium of claim 9 wherein the variable number N and the set of N bitrates are chosen to maximize a playback quality of a media signal reconstructed from transmitted data packets received by the decoder by assuming data packet losses during transmission consistent with a model of the channel used to transmit the data packets.

13. The computer readable medium of claim 12 wherein the decoder selects path through one bitrate representation of each sequential frame of the media signal from transmitted data packets that are received by the decoder to reconstruct a representation of the media signal having a minimum total distortion value, and wherein the total distortion is summed from distortion values of each bitrate representation in the selected path, and the selected path has the minimum total distortion value relative to total distortion values of each other possible path through available bitrate representations of each sequential frame.

14. The computer readable medium of claim 9 wherein the signal characteristics of the media signal include one or more rate-distortion (R/D) curves corresponding to content of the media signal.

15. A method for encoding a media signal to be transmitted across a lossy network transmission channel, comprising: receiving rate/distortion parameters of a media signal; receiving bandwidth and loss characteristics of a lossy network transmission channel; evaluating the distortion parameters, the bandwidth and the loss characteristics to determine a variable number of bitrate representations to be used for encoding each frame of the media signal, wherein the variable number is two or more, and wherein the variable number is selected to minimize a rate distortion of an encoding of the media signal in view of the loss characteristics; allocating the bandwidth in a set of bitrates corresponding to the variable number of bitrate representations, said set of bitrates including representing a range of bitrates from highest to lowest; using an encoder device for every frame of the media signal, encoding a representation of that frame at every bitrate of the set of bitrates; and as each frame of the media signal is encoded, constructing a composite data packet that includes a single bitrate representation of the current frame encoded at the highest bitrate of the set of bitrate representations, and as many of the preceding sequential frames as are available up to a maximum number of frames equal to the variable number of bitrate representations, each preceding sequential frame encoded at next lower one of the set of bitrate representations.

16. The method of claim 15 further comprising transmitting each packet to a decoder across the network transmission channel as soon as that packet is constructed.

17. The method of claim 16 wherein the decoder decodes each received packet, and as soon as a sufficient number of packets have been received, the decoder selects a path through the various bit rate representations of each frame to reconstruct the media signal at a playback quality having a minimum total distortion value summed from distortion values of each bitrate representation in the selected path relative to total distortion values of each other possible path through available bitrate representations of each frame.

18. The method of claim 16 further comprising periodically revaluating one or more of the distortion parameters, the bandwidth, and the loss characteristics during encoding of the media signal, and periodically updating the variable number of bitrate representations and the set of bitrates to be used for encoding each frame of the media signal.

19. The method of claim 15 wherein the rate/distortion parameters of the media signal include one or more rate-distortion (R/D) curves corresponding to one or more types of content included in the media signal.

20. The method of claim 19 wherein the types of content include one or more of voiced audio segments, unvoiced audio segments, video segments, and mixed segments.

* * * * *